(12) United States Patent
Farley

(10) Patent No.: US 6,631,564 B1
(45) Date of Patent: Oct. 14, 2003

(54) ELECTRICIANS LEVELING DEVICE

(76) Inventor: Patrick E. Farley, 61 N. Park Ave., Buffalo, NY (US) 14216

( * ) Notice: Subject to any disclaimer, the term of this patent is extended or adjusted under 35 U.S.C. 154(b) by 0 days.

(21) Appl. No.: 09/633,636

(22) Filed: Aug. 7, 2000

Related U.S. Application Data

(63) Continuation-in-part of application No. 09/090,541, filed on Jun. 4, 1998, now abandoned.

(51) Int. Cl.[7] ................................................ G01C 9/26
(52) U.S. Cl. ................................. 33/371; 33/DIG. 10
(58) Field of Search .......................... 33/333, 334, 370, 33/371, 528, 533, 613, 645, DIG. 10

(56) References Cited

U.S. PATENT DOCUMENTS

| | | | | |
|---|---|---|---|---|
| 3,116,563 A | * | 1/1964 | Gelbman | 33/354 |
| 3,279,080 A | * | 10/1966 | Stepshinski | 33/354 |
| 3,872,383 A | * | 3/1975 | Kolodziej | 324/508 |
| 3,967,195 A | * | 6/1976 | Averitt et al. | 324/508 |
| 3,984,765 A | * | 10/1976 | Rocci, Jr. | 324/508 |
| 4,118,690 A | * | 10/1978 | Paynton | 340/656 |
| 4,127,807 A | * | 11/1978 | Peplow et al. | 324/508 |
| 4,793,069 A | * | 12/1988 | McDowell | 33/528 |
| 4,888,880 A | * | 12/1989 | Parker | 33/645 |
| 5,168,235 A | * | 12/1992 | Bonner | 324/508 |
| 6,003,234 A | * | 12/1999 | Seibert | 33/371 |
| 6,209,214 B1 | * | 4/2001 | Talavera | 33/528 |
| 6,434,848 B1 | * | 8/2002 | Gordon et al. | 33/528 |

OTHER PUBLICATIONS

"Grounded vs. Grounding", date unknown, APOGEE, Fundamentals of Electricity, from website http://cipco.apogee.net/foe/fsggg.asp.*

* cited by examiner

Primary Examiner—Diego Gutierrez
Assistant Examiner—R. Alexander Smith
(74) Attorney, Agent, or Firm—Crossetta & Associates

(57) ABSTRACT

A device for leveling a plug receiving receptacle in an electric outlet box is disclosed which comprises a surface having spaced apart opposing male bar prongs arranged along generally parallel axes extending about perpendicular from the surface, arranged to insert into corresponding female bar slots of an electric plug receiver and level means, arranged to indicate horizontal and vertical level of an axis perpendicularly intersecting the parallel bar prong axes.

20 Claims, 2 Drawing Sheets

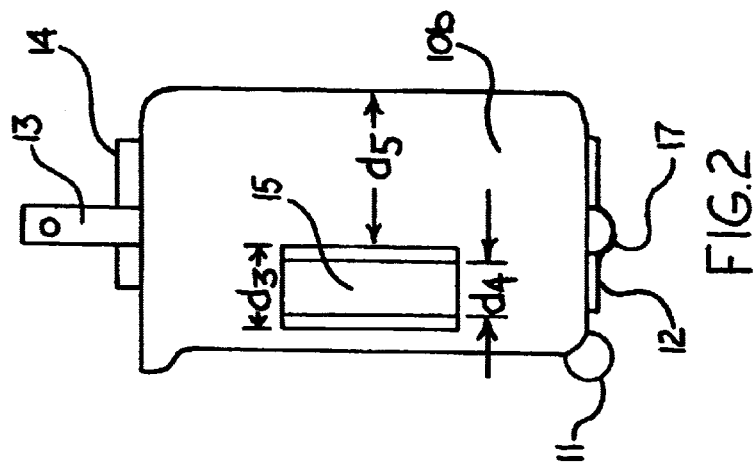
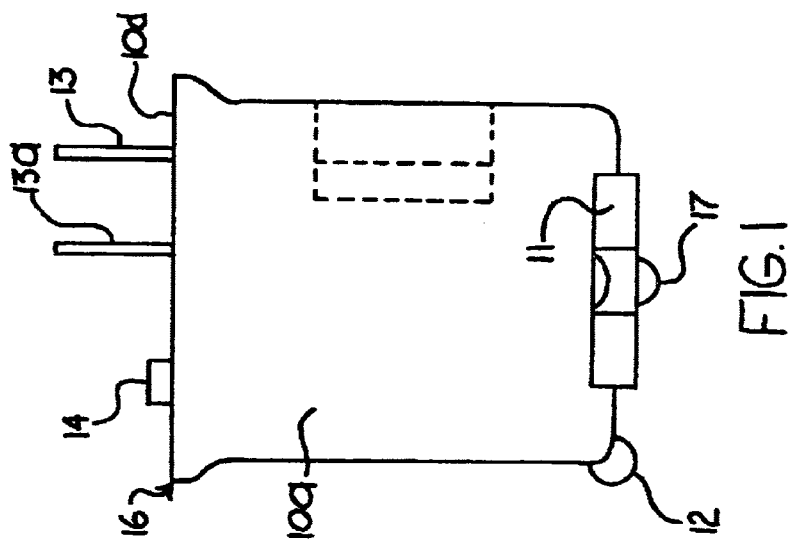
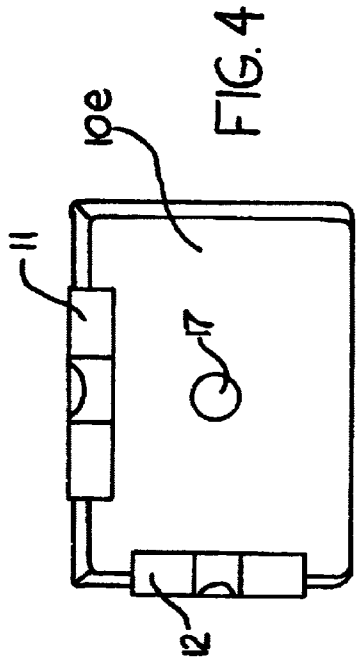
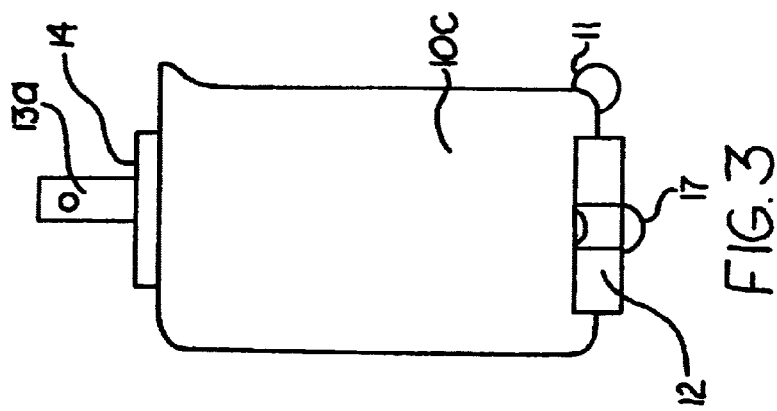

ELECTRICIANS LEVELING DEVICE

This is a Continuation-in-part of U.S. Ser. No. 09/090,541 filed Jun. 6, 1998, now abandoned.

This invention relates to a leveling device which is particularly suitable for leveling and/or aligning electric components such as plug connector receiving receptacles, switches and combinations of such, arranged in an electrical outlet box.

BACKGROUND OF THE INVENTION

Electric outlet boxes are commonly installed on vertical walls throughout modern buildings. Such outlets boxes are generally intended for mounting electric components such as plug connector receiving receptacles, switches and/or combinations thereof to provide necessary assemblies for the convenient access of the occupant. Typically such outlet boxes have standard sized threaded holes arranged in standard spaced alignment at opposite sides thereof for mounting one or more components, with plug receiving receptacles and/or switches having one or more oblong holes arranged at opposite ends thereof which generally correspond and mate with the threaded holes of the outlet box. The components are mounted to the outlet box through screws which are commonly inserted through the oblong holes of a component to the threaded holes of the box for securely mounting a component to the outlet box.

The outlet boxes are generally mounted into or flush with the surface of the wall such that they cannot be easily moved for re-alignment, and generally are initially aligned to a generally vertical alignment or "vertical level" in relation to vertical lines of the building. Outlet boxes are visible, but necessary contrivances on the walls of the building and to make them less conspicuous are generally hidden by cover plates which have standard sized openings arranged to surround necessarily visible switch handles or plug receivers of the plug receiving receptacles. Such cover plates are generally sized to extend beyond the borders of the outlet box so as to cover the opening in the wall for access to the outlet box and provide a finished look to the assembly. The cover plates are generally screw mounted to the plug connector receiving receptacle and/or switch, which in turn is/are mounted to the outlet box.

Thus, the electrician who strives to assure that the assembly has a finished vertically level appearance, must first assure that the components are mounted to the outlet box in a vertically level arrangement by manipulation of mounting screws within the oblong holes of the components. When there is more than one receptacle, switch or combination of components, each must be properly spaced from the other to enable appropriate alignment and mating of the switch handles and or plugs with the corresponding holes in the cover plate.

In the past, the electrician has generally relied upon his/her visual acumen for appropriate mounting of the components and his/her ability to accurately visually predict a suitable vertical alignment and appropriate spacing among components. The problem with such is that all electricians are not equal in capability and since they must work close to the outlet assembly when doing the necessary manipulation and accurate viewing of vertical alignment is best done from a far perspective, alignment is a hit-or miss proposition. The result is that the electrician generally ends up availing the services of another to view the vertical alignment from a far perspective while he/she adjusts the components or viewing appearance and spaces the components through a trial and error process.

An object of the present invention is to provide an electricians leveling device which can be conveniently used to level standard components of a outlet box.

It is a further object of the invention to provide an electricians level which can be conveniently used to accurately space components in a multiple component outlet box.

It is another object of the invention to provide an electricians level which is convenient to use and has multiple utilities.

These and other objects of the invention will become apparent in the following recitation of the invention.

SUMMARY OF THE INVENTION

The method of the invention is to utilize a leveling means to ascertain the vertical and/or horizontal level of components of an outlet box, by using the female bar slots of a plug receiving receptacle component as a base level reference platform. Plug receiving receptacle components generally comprise two spaced apart plug receivers. Each of the plug receivers in turn generally comprise two, spaced apart, generally parallel female bar slots, arranged to accept corresponding flat bar prongs of a plug connector to complete a standard AC current circuit, and a rounded ground slot which is arranged offset from the parallel bar slots. The parallel female bar slots of both plug receivers in a receptacle component are arranged in generally parallel aligned symmetry with a central axis through the oblong mounting holes of the receptacle, and vertical or horizontal alignment of either of the parallel female bar slots of a plug receiving receptacle, automatically vertically or horizontally aligns the entire receptacle.

In the present invention, a device is provided comprising opposing, generally parallel, generally rectilinear male bar prongs which are arranged to insert into corresponding female bar slots of one of the plug receivers of a plug receiving receptacle. A spirit or other suitable level is provided which is arranged to designate a horizontal level when the parallel male bar prongs are disposed around a vertical axis.

Thus, in the method of the invention the user loosely mounts a plug receiving receptacle in an outlet box, plugs the device of the invention into one of the plug receivers of the receptacle, and by manipulating the device aligns the receptacle to a vertical position as indicated by a horizontal alignment designation of a spirit level bubble or electronic level indicator means. The mounting screws are then tightened to fix the receptacle to a desired aligned position. Since cover plates of outlet boxes are manufactured to standard openings in standard spaced positions, the standard plug receiving receptacle, fixed to the standard outlet box, serves as a base level reference platform from which all measurements and alignments of all other components can be derived.

Thus, in accord with the method of the invention a device having a housing which is shaped and formed to have reference means such as shoulders, edges and the like which are standard measured distances from the female bar slots of the first fixed base level reference, are representative of points of alignment for other components such as additional plug receiving receptacles, one or more switches and the like.

The device of the present invention comprises the combination of a leveling means, preferably spirit leveling means, and at least one plug connector having two, spaced apart, generally parallel, generally flat male bar prongs aligned to matingly insert into corresponding parallel female bar slots of a standard AC current plug receiving receptacle component. The level means of the device is arranged such that it provides a visual and/or audio indication of horizontal alignment when the parallel flat bar prongs are arranged along vertical axes.

The device of the invention generally comprises a housing, from which the generally parallel, flat bar prongs extend on one side, the housing being sized and shaped for convenient insertion of the flat bar prongs into one outlet of a plug connector receptacle. The leveling means is mounted to the housing, preferably built into the housing, on a side adjacent and/or opposite to the side comprising the flat bar prongs.

In a preferred embodiment of the assembly of the invention, the housing is generally rectilinear and formed from a molded plastic or the like. The bar prongs can be of any suitable electrically conductive and/or non-conductive material, but generally are of a conductive metal, being attached to the housing by molding the plastic housing around ends thereof, with opposite ends of the flat prongs extending from a side or end of the molded housing. When the bar prongs are of a conductive material, they are insulated separate from each other to prevent short circuiting of the plug receiver. A spirit or other suitable level is generally molded into the housing, at an opposite and/or adjacent side thereof, arranged to provide a ready view the level indicator such as a bubble, light, meter and the like when the prongs are inserted into a prong receiving receptacle.

One or more spirit or other levels can be comprised in a housing and generally it is convenient to have at least two levels arranged to indicate level perpendicular to each other. In such arrangement, a first level will indicate vertical alignment of the parallel bar prongs, e.g. the most popular vertical alignment of a receptacle plug; while a second level will indicate horizontal alignment of the parallel bar prongs, e.g. a less popular but still common horizontal alignment of a receptacle plug.

In an embodiment of the invention, the housing comprises internal wiring from the parallel bar prongs which are enabled to connect and/or comprise circuitry to a meter, light or the like for testing circuit continuity and the like. In a preferred embodiment a molded elastomeric housing comprises a visible light emitting source, which is activated through internal wiring upon insertion into the plug receiving receptacle and completion of a circuit among the parallel bar prongs. In a still further embodiment, an indicator, meter or the like is activated upon detection of a completed circuit.

In another embodiment of the invention, the housing comprises surfaces, edges, shoulders or the like which are dimensioned from the parallel bar prongs in standard reference distances to enable alignment of other components which may be arranged in the outlet box. For example, in one embodiment, the device housing is dimensioned to a width wherein upon insertion of the parallel bar prongs into a first plug receiving receptacle, a shoulder on a surface along the width of the housing, will abut the edge of a face of a second plug receiving receptacle at a standard prescribed distance corresponding to alignment with standard cover plate openings. Similarly, a shoulder and/or edge of the housing will be dimensioned to abut a handle or perimeter shoulder of a switch at a standard prescribed distance corresponding to alignment with standard combined switch and receptacle cover plates. In a preferred embodiment, the side of the device housing comprising the male bar prongs, comprises a raised curved shoulder spaced a standard distance from the male bar prongs which is arranged to generally engage a rounded edge of an adjacent receptacle receiver at a distance corresponding to the spaced openings of a multiple plug receptacle cover, while the side itself continues to extend to an edge corresponding to the spaced standard distance from the male bar prongs to the edge of a spaced opening of a switch handle of a combination receptacle and switch cover plate. Thus, the device enables ready reference location and level of a second, third, etc., receptacle(s) in a multiple receptacle outlet box and ready reference location and leveling of a switch in a combination receptacle/switch outlet.

In another embodiment, a molded housing comprises a deep slot sized for convenient insertion of a switch handle for quick determination of switch level in a non-receptacle containing outlet box. The slot can be of variable stepped widths, depths and/or lengths for various different switch handles, or there can be multiple slots of different dimensions and the like. In a preferred embodiment, the slot(s) is contained in a side of the device adjacent the male bar prongs and the side extends to an edge corresponding to the spaced standard distance between spaced opening of switch handles of a multiple switch cover plate.

In still further embodiments, the device of the invention comprises, a narrow slot or the like into which tabs of a switch or receptacle can be inserted to be bent for removal, or multiple other combination components useful to the electrician in performing jobs associated with the installation of components in an outlet box.

For a fuller understanding of the device of the present invention, reference should be made to the following detailed description taken in connection with the accompanying drawings.

BRIEF DESCRIPTION OF THE DRAWINGS

FIG. 1 is a top plan view of an electricians level of the invention.

FIG. 2 is a right side plan view of the electricians level of FIG. 1.

FIG. 3 is a left side plan view of the electricians level of FIG. 1.

FIG. 4 is a front plan view of the electricians level of FIG. 1.

DETAILED DESCRIPTION OF THE INVENTION

Figure 6:
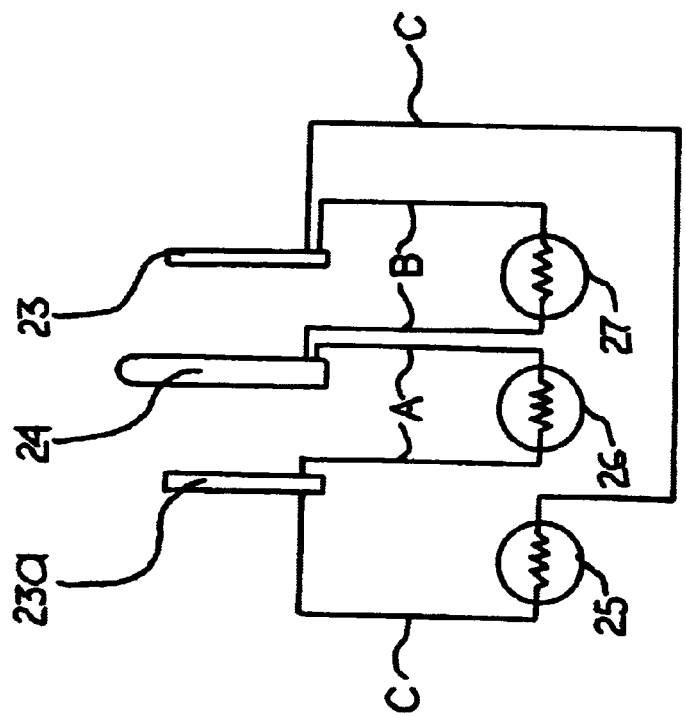
FIG. 6 is a diagrammatic view of the circuit comprising a current indicator of an electricians level of the invention.
Figure 5:
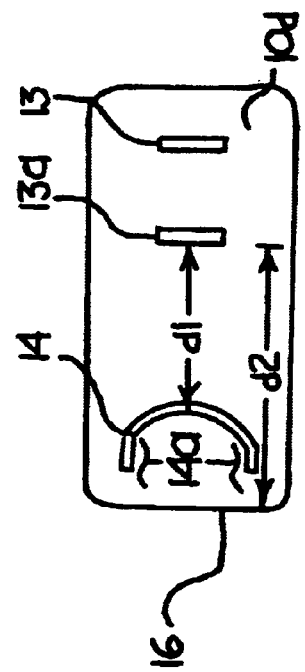
FIG. 5 is a rear plan view of the electricians level of FIG. 1.

Referring now to FIGS. 1–5, therein is illustrated a device of the invention wherein body 10, comprising top surface 10a, rear surface 10d, front surface 10e and side surfaces 10b and 10c, is illustrated as a molded resilient elastomeric unit. Spirit level 11 is mounted at about the edge of front surface 10e and top surface 10a of the unit, and spirit level 12 is mounted at about the edge of front surface 10e and left side surface 10c of the unit, the arrangements of the levels being such that a leveling bubble can be observed from the front, top and/or side surfaces of the unit through a 90° rotation of the unit. In addition, spirit level 12 is arranged such that the curvature of the level is inclined toward rear surface 10d, sufficient to enable visual determinations of level in respect to side surface 10b.

Rear surface 10d of the unit comprises parallel male bar prongs 13 and 13a, which are sized to insert into mating female slots of a receiving plug (not shown). The bar prongs are formed from an electrically conductive metal and extend into the molded unit and are held in place by the molded unit. Curved shoulder 14 is arranged on rear surface 10d, with its interior curved surface 14a generally sized and dimensioned to engage a standard curved edge of a standard plug receiver of a standard plug receiving receptacle. The distance "$d_1$" illustrated in FIG. 5 corresponds to a standard measured distance, of about 2 cm, measured from male bar prong 13a to a standard adjacent opening edge of a standard cover for a dual plug receptacle outlet box. Distance $d_2$, illustrated in FIG. 5 corresponds to a standard distance of about 3 cm, measured from male bar prong 13a to a standard rectangular surround shoulder of a switch. Rectilinear surround shoulders are generally standard components of switches and are sized and dimensioned to mate into a standard rectilinear opening of a standard cover having an opening for a switch receptacle in a combined switch plug receptacle installation.

Slot 15, in side 10b of the unit is illustrated as being arranged near the edge among top surface 10a and side surface 10b, and as being of stepped width, beginning with a greater width corresponding to distance $d_3$ at the surface of side 10b to a narrower width of $d_4$ within the interior elastomeric mass of the unit body. Switch handles are generally rectilinear shaped and of two different standard widths, a wide width $d_3$, which is generally the standard width of lighted switch handles and a narrower width $d_4$, which is a generally standard width of non-lighted switch handles. In the illustrated embodiment, the stepped slot is molded into the unit, enabled to receive either switch handle and the elastomeric unit, having a thinner wall at one side of the slot, tends deform to snugly hold the handles flush against the thicker wall, in an axis parallel to the male bar prongs.

Light 17, comprises a small light emitting source, which is mounted into the elastomeric unit and completes a circuit among metal bar prongs 13 and 13a.

In the overall method of use of the device of the invention, the rear surface of the unit is plugged into mating female slots of a first plug receiver of a plug receiving receptacle and the receptacle is aligned by adjusting the mounting screws of the component by means of the bubble indicator of spirit level 11 if the wall mounted outlet box is arranged to hold components vertical, or spirit level 12 if the wall mounted outlet box is arranged to hold components horizontal. Wall mounted outlet boxes arranged to hold components horizontal are not very common, and it is extremely rare that such arrangement holds more than one component or even a component other than a plug receiving receptacle. In the case of a horizontal arrangement containing two parallel plug receiving receptacle components, the lower receptacle is fixed to appropriate horizontal alignment using spirit level 12 and the distance to the upper receptacle is fixed in parallel, properly spaced alignment by engaging it against shoulder 14 on face 10d of the unit.

In the case of a vertical arrangement of multiple components in a wall mounted outlet box, a right most first receptacle is adjusted and fixed to appropriate vertical alignment by plugging the rear surface of the unit into mating female slots of one of its plug receivers and the receptacle is aligned by adjusting the mounting screws of the component by means of the bubble indicator of spirit level 11. A second receptacle is spaced an appropriate distance to the left of the first receptacle and in parallel alignment by engaging it against shoulder 14 and then checked and/or further adjusted for vertical by plugging the unit into a plug receiver of the second receptacle. The process is repeated for third, fourth or more receptacles as may be installed into the outlet box.

In another outlet box arrangement, a first right most plug receptacle is fixed to appropriate vertical alignment using spirit level 11 and the spaced distance left to a switch component is aligned using edge 16 of the unit to engage the surround shoulder of a switch at the appropriate distance and vertical alignment. In double switch arrangements, wherein two switches are comprised in a double plug receptacle type surround, the alignment and spacing of the switches to the plug receptacle is ascertained using curved shoulder 14 of the unit.

In the case of a vertical arrangement of two or more switch components, a first right side switch is fixed to appropriate vertical alignment by inserting the switch handle in slot 15 and using spirit level 12 to ascertain vertical alignment of the switch. A second switch is mounted to the left of the first switch, the distance to the next switch handle being determined using standard distance $d_5$ to the edge of the side lob with the bottom surface of the unit (not shown), engaging a shoulder of the rectilinear surround of the second switch handle, and so forth mounting each subsequent switch to the left of the previous switch as appropriate in standard spaced vertical alignment.

FIG. 6 illustrates typical circuitry for determining continuity comprised in a device of the present invention. Therein, an embodiment of the device is illustrated as comprising two parallel male bar prongs, 23 and 23a, and a rounded ground prong 24. The unit comprises three light emitting units sources 25, 26 and 27, one comprising a completed circuit "A" among the rounded ground plug and a first male bar prong, another a completed circuit "B" among the second male bar prong and the rounded ground prong, and the third a completed circuit "C" among the two male bar prongs for ascertaining continuity of a live wired receptacle.

I claim:

1. A device for leveling, registered spacing and aligning of adjacent first and second plug receiving receptacles arranged in an electric outlet box:

said device having a rear surface with a single set of two spaced apart opposing male bar prongs arranged along spaced apart bar prong axes extending outwardly from said rear surface, said male bar prongs being sized, dimensioned and arranged to matingly insert into two corresponding female bar slots of an electric plug receiver of said first adjacent plug receiving receptacle;

first and second level means, said first level means arranged to indicate horizontal level and said second level means arranged to indicate vertical level of an axis intersecting about perpendicular to said spaced apart bar prong axes;

said rear surface comprising reference means, spaced from an edge of said surface and from said male bar prongs, said reference means being sized and arranged to engage said second plug receiving receptacle in registered spaced alignment with said male bar prongs; wherein a surface of said device comprises an edge and a slot selected from the group consisting of stepped and elastomeric walled, said slot dimensioned to engage different dimensioned handles of a switch, and being spaced from said edge a distance corresponding to a standard reference for engaging a surface of a switch receptacle.

2. The device of claim 1 wherein said level means comprises spirit level means.

3. The device of claim 1 wherein said rear surface is generally planer and said reference means comprises a shoulder extending outwardly from said generally planer rear surface, said shoulder being spaced from said male bar prongs and arranged to engage a side surface of said second plug receiving receptacle.

4. The device of claim 3 wherein said shoulder is spaced from said male bar prongs a measured distance corresponding to a standard reference for alignment of a standard outlet cover.

5. The device of claim 3 wherein said shoulder is curved.

6. The device of claim 1 wherein said reference means is arranged to engage a surface of a plug receiver of said second plug receiving receptacle.

7. The device of claim 1 wherein said device comprises a molded elastomer.

8. The device of claim 1 wherein said slot is dimensioned to grippingly receive a handle of a switch.

9. The device of claim 8 wherein said slot comprises a wall which retains said handle of said switch in said slot by elastomer memory.

10. The device of claim 8 wherein said slot is stepped to engage two different dimensioned handles.

11. The device of claim 1 wherein said male bar prongs are comprised of electrical conductive material and are in enabling continuity circuitry.

12. The device of claim 11 comprising means for visually indicating electrical continuity of the opposing male bar prongs.

13. The device of claim 1 wherein said reference means is spaced from said male bar prongs a measured distance corresponding to a standard reference for alignment of a standard outlet cover.

14. A device for leveling, registered spacing and aligning of adjacent first and second plug receiving receptacles arranged in an electric outlet box:

said device having a rear surface with only a single set of spaced apart male bar prongs arranged along spaced apart bar prong axes extending outwardly from said rear surface, a first male bar prong of said set being a hot wire bar prong and being sized, dimensioned and arranged to matingly insert into a corresponding female hot wire bar slot of an electric plug receiver of said first adjacent plug receiving receptacle, and a second male bar prong of said set being a neutral grounded wire bar prong and being sized, dimensioned and arranged to matingly insert into a corresponding female neutral grounded wire bar slot of said electric plug receiver of said first adjacent plug receiving receptacle;

first and second level means, said first level means arranged to indicate horizontal level and said second level means arranged to indicate vertical level of an axis intersecting about perpendicular to said spaced apart bar prong axes;

wherein said rear surface comprises reference means, spaced from said male bar prongs, said reference means being sized and arranged to engage said second plug receiving receptacle in registered spaced alignment with said first plug receiving receptacle, when said first and second male bar prongs are matingly inserted into said corresponding female hot wire and neutral grounded wire bar slots of said first adjacent plug receiving receptacle; and, a surface of said body comprises a slot dimensioned to receive a handle of a switch, said slot being spaced from an edge of said surface having said slot, a measured distance corresponding to a standard reference for engaging a surface of a switch receptacle.

15. The device of claim 14 wherein said slot is dimensioned to grippingly receive a handle of a switch.

16. The device of claim 15 wherein said slot comprises a thin wall which retains said handle of said switch in said slot by elastomer memory.

17. The device of claim 14 wherein said slot is stepped to engage two different dimensioned handles.

18. The device of claim 14 wherein said first and second male bar prongs are formed from a material selected from conductive and non-conductive.

19. The device of claim 14 further comprising a male case grounding prong extending outwardly from said rear surface, said male case grounding prong being a case grounding wire prong and being sized, dimensioned and arranged to matingly insert into a corresponding female case grounding wire slot of said electric plug receiver of said first adjacent plug receiving receptacle.

20. The device of claim 19 wherein said first and second male bar prongs and said male case grounding prong are comprised of electrical conductive material and are in enabling circuitry with continuity indicating means.

* * * * *